United States Patent
Del Donno et al.

(10) Patent No.: US 10,428,823 B2
(45) Date of Patent: Oct. 1, 2019

(54) CENTRIFUGAL COMPRESSOR APPARATUS

(71) Applicant: GENERAL ELECTRIC COMPANY, Schenectady, NY (US)

(72) Inventors: Andrew Mark Del Donno, Lynn, MA (US); Justin Anthony Black, Lynn, MA (US)

(73) Assignee: General Electric Company, Schenectady ( * ) Notice: Subject to any disclaimer, the term of this patent is extended or adjusted under 35 U.S.C. 154(b) by 433 days.

(21) Appl. No.: 14/918,622

(22) Filed: Oct. 21, 2015

(65) Prior Publication Data

US 2016/0131144 A1     May 12, 2016

Related U.S. Application Data

(60) Provisional application No. 62/076,337, filed on Nov. 6, 2014.

(51) Int. Cl.

| F04D 29/28 | (2006.01) |
|---|---|
| F04D 19/02 | (2006.01) |
| F04D 29/26 | (2006.01) |
| F04D 29/62 | (2006.01) |
| F04D 29/64 | (2006.01) |
| F04D 17/02 | (2006.01) |
| F02C 3/08 | (2006.01) |
| F01D 5/02 | (2006.01) |

(52) U.S. Cl.
CPC .............. *F04D 19/02* (2013.01); *F01D 5/025* (2013.01); *F02C 3/08* (2013.01); *F04D 17/025* (2013.01); *F04D 29/266* (2013.01); *F04D 29/285* (2013.01); *F04D 29/624* (2013.01); *F04D 29/644* (2013.01)

(58) Field of Classification Search
CPC ...... F04D 19/02; F04D 17/025; F04D 29/266; F04D 29/284; F04D 29/285; F04D 29/62; F04D 29/624; F04D 29/644; F01D 5/025; F02C 3/08
See application file for complete search history.

(56) References Cited

U.S. PATENT DOCUMENTS

| 2,388,456 | A | 11/1945 | Wildhaber |
| 2,469,125 | A | 5/1949 | Meisser |
| 2,819,012 | A | 1/1958 | Atkinson |
| 3,303,989 | A | 2/1967 | Rurik et al. |
| 3,941,501 | A | 3/1976 | Shank |

(Continued)

FOREIGN PATENT DOCUMENTS

| CN | 1087405 A | 6/1994 |
| GB | 1256119 A | 12/1971 |

OTHER PUBLICATIONS

Unofficial English Translation of Japanese Office Action issued in connection with corresponding JP Application No. 2015-210287 dated Nov. 22, 2016.

(Continued)

*Primary Examiner* — Christopher Verdier
*Assistant Examiner* — Michael L Sehn
(74) *Attorney, Agent, or Firm* — General Electric; Pamela Kachur

(57) ABSTRACT

A compressor has an axial portion and a centrifugal portion. A disk structure is provided to support the centrifugal portion and is connected to the centrifugal portion with a rabbet joint.

8 Claims, 3 Drawing Sheets

(56) References Cited

U.S. PATENT DOCUMENTS

| | | | | |
|---|---|---|---|---|
| 4,183,719 A * | 1/1980 | Bozung | ............... | F01D 5/045 |
| | | | | 415/143 |
| 6,575,703 B2 * | 6/2003 | Simeone | ............... | F01D 5/066 |
| | | | | 416/220 R |
| 7,156,612 B2 * | 1/2007 | Warikoo | ............... | F01D 5/026 |
| | | | | 415/143 |
| 8,075,247 B2 | 12/2011 | Romani et al. | | |
| 8,147,208 B2 * | 4/2012 | Hagshenas | ............... | F01D 5/026 |
| | | | | 415/134 |
| 8,453,463 B2 * | 6/2013 | Grewal | ............... | F01D 5/08 |
| | | | | 415/115 |
| 2004/0009060 A1 | 1/2004 | Romani et al. | | |
| 2006/0222499 A1 | 10/2006 | Warikoo et al. | | |
| 2012/0272663 A1 | 11/2012 | Moussa et al. | | |
| 2013/0098061 A1 * | 4/2013 | Matwey | ............... | F01D 5/046 |
| | | | | 60/785 |

OTHER PUBLICATIONS

European Search Report and Opinion issued in connection with corresponding EP Application No. 15192938.7 dated Mar. 31, 2016.
Machine Translation and First Office Action and search issued in connection with corresponding CN Application No. 201511035896.8 dated Jul. 25, 2017.

\* cited by examiner

US 10,428,823 B2

CENTRIFUGAL COMPRESSOR APPARATUS

STATEMENT REGARDING FEDERALLY SPONSORED RESEARCH AND DEVELOPMENT

The U.S. Government may have certain rights in this invention pursuant to contract no W911 W6-11-2-0009 awarded by the Department of The Army.

BACKGROUND OF THE INVENTION

This invention relates generally to turbomachinery compressors and more particularly relates to centrifugal stages of such compressors.

A gas turbine engine includes, in serial flow communication, a compressor, a combustor, and turbine. The turbine is mechanically coupled to the compressor and the three components define a turbomachinery core. The core is operable in a known manner to generate a flow of hot, pressurized combustion gases to operate the engine as well as perform useful work such as providing propulsive thrust or mechanical work.

One known configuration of the compressor is the "axi-centrifugal" compressor which includes an upstream axial-flow portion that discharges to a downstream centrifugal-flow portion. In some designs it is desirable to have a relatively large radius at the inlet of the centrifugal-flow portion. However, because stresses due to speed scale with the square of the ring radius, relatively small increases in radius can result in significant increases in hoop stresses in the centrifugal impeller near its attachment to the axial-flow portion. The result is that the centrifugal impeller, due to its combination of radius and wheel speed, cannot self-support its own speed induced-loads. Prior art connection methods between the two compressor portions, including CURVIC face couplings and bolted joints, cannot operate at this high a radius and wheel speed with acceptable stress levels.

Accordingly, there remains a need for an axi-centrifugal compressor that is operable with at a high radius and wheel speed, with acceptable stress levels.

BRIEF DESCRIPTION OF THE INVENTION

According to one embodiment, a compressor has an axial portion and a centrifugal portion. A disk structure is provided to support the centrifugal portion and is connected to the centrifugal portion with a rabbet joint.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
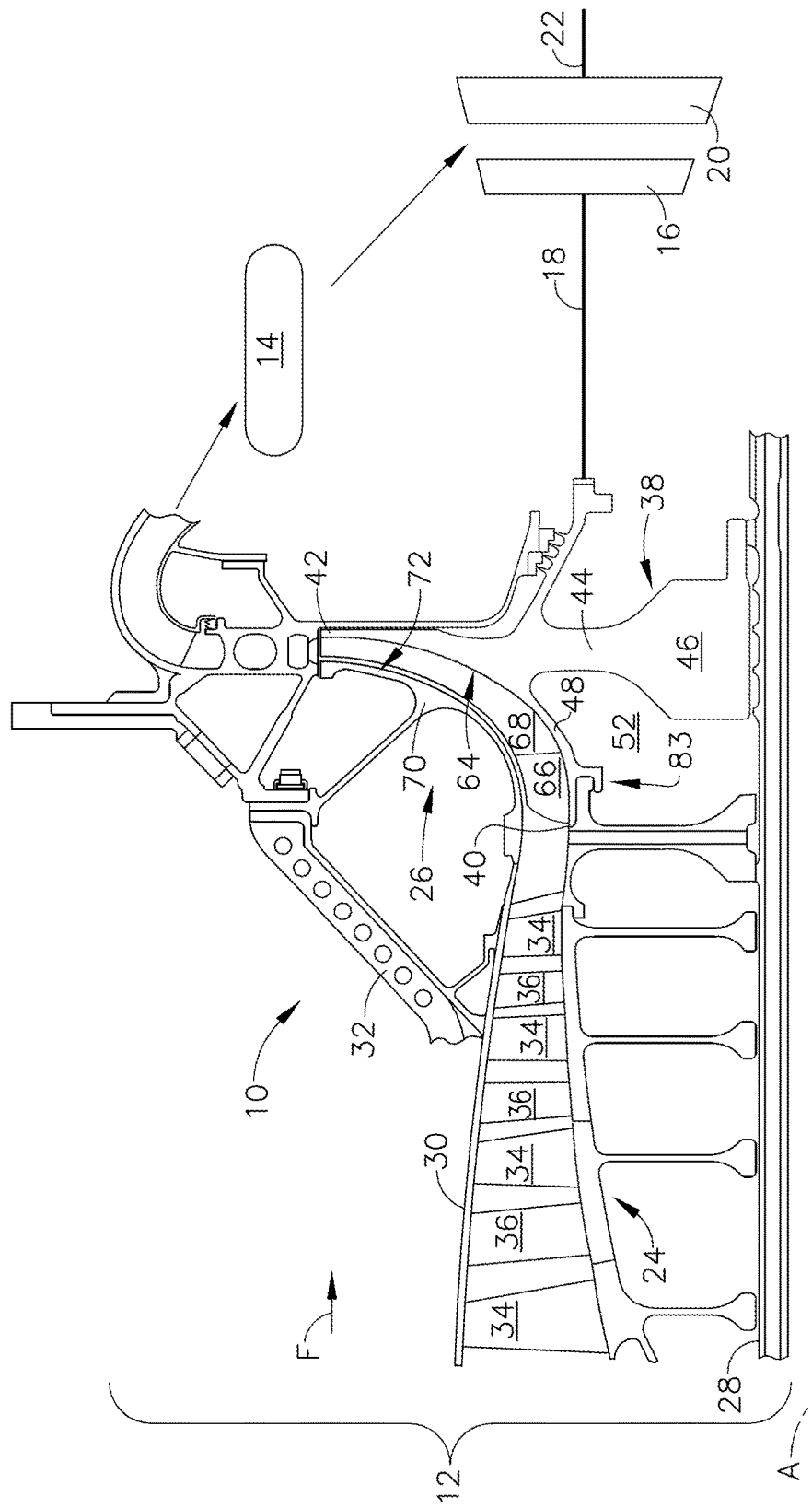
FIG. 1 is a cross-sectional, schematic view of a gas turbine engine that incorporates a compressor apparatus constructed in accordance with an embodiment of the present invention.
Figure 2:
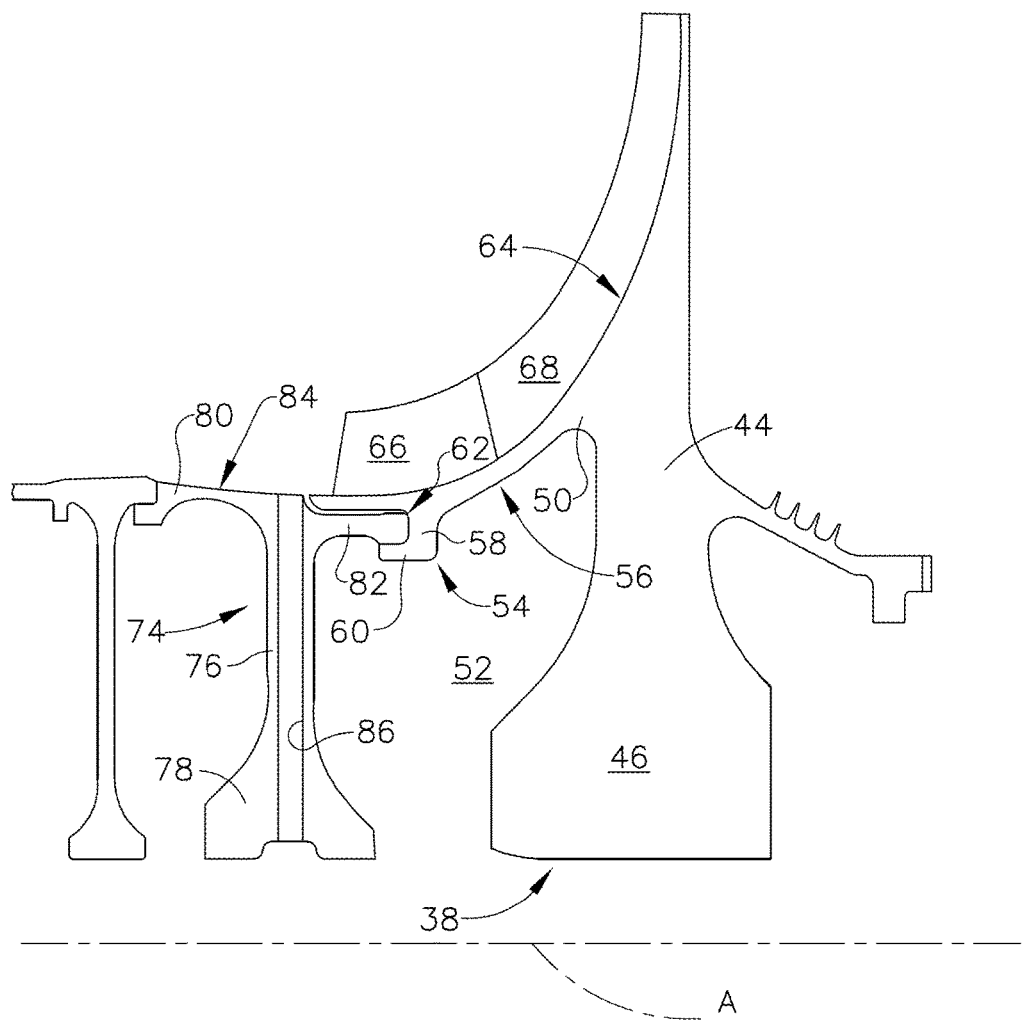
FIG. 2 is an enlarged cross-sectional view of a portion of the compressor apparatus of FIG. 1.

Referring to the drawings wherein identical reference numerals denote the same elements throughout the various views, FIGS. 1 and 2 depict an exemplary compressor 10 constructed in accordance with an aspect of the present invention. In the illustrated example, the compressor 10 is incorporated into a gas turbine engine 12 with a central longitudinal axis "A" and including in sequential flow sequence, the compressor 10, a combustor 14, and a gas generator turbine 16 (the combustor 14 and compressor 16 are shown schematically). As used herein, the terms "axial" and "longitudinal" both refer to a direction parallel to the axis A, while "radial" refers to a direction perpendicular to the axial direction, and "tangential" or "circumferential" refers to a direction mutually perpendicular to the axial and tangential directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The compressor 10 provides compressed air that passes primarily into the combustor 14 to support combustion and partially around the combustor 14 where it is used to cool both the combustor liners and turbomachinery further downstream. Fuel is introduced into the forward end of the combustor 14 and is mixed with the air in a conventional fashion. The resulting fuel-air mixture flows into the combustor 14 where it is ignited to generate hot combustion gases. The hot combustion gases are discharged to the gas generator turbine 16 where they are expanded so that energy is extracted. The gas generator turbine 16 drives the compressor 10 through a shaft 18. In the illustrated example, the engine 12 is a turboshaft engine and a work turbine (also called a power turbine) 20 is located downstream of the gas generator turbine 16 and coupled to an output shaft 22 which can be connected to a mechanical load. However, the principles described herein are equally applicable to any axi-centrifugal compressor. For example, they may apply to a compressor driven by an external prime mover.

The compressor 10 includes an axial portion 24 and a centrifugal portion 26. The two portions 24 and 26 are clamped together with a significant force parallel to the axis A using a tie rod 28 in a known manner (only a portion of the tie rod 28 is illustrated). An annular casing 30 surrounds the entire compressor 10. As viewed in cross-section, an aft portion of the casing 30 includes an outer skirt 32 that diverges radially outward from the remainder of the casing 30, forming a "Y" shape. The axial portion 24 of the compressor 10 is configured for axial fluid flow. It includes a number of stages, each of which includes a row of rotating airfoils or blades 34 and row of stationary airfoils or vanes 36. The vanes 36 serve to turn the airflow exiting an upstream row of blades 34 before it enters the downstream row of blades 34.

The centrifugal portion 26 of the compressor 10 is configured for centrifugal or mixed axial-centrifugal fluid flow. It includes an impeller 38 mounted for rotation with the shaft 18, and having axially forward and aft ends 40 and 42. The impeller 38 includes an annular impeller disk 44, with a hub 46 disposed at its radially inner end. An annular impeller arm 48 extends axially forward from the impeller disk 44. The impeller arm 48 is cantilevered from the impeller disk 44, that is, only its proximal end 50 is attached to the impeller disk 44, and the remainder of the impeller arm 48 is unsupported, there being an open gap 52 without support structures between the impeller arm 48 and the inner portion of the impeller disk 44.

The impeller arm 48 includes a hook 54 extending from its radially inner surface 56, a short distance axially aft from the forward end 40. The hook 54 is L-shaped in half-section, having a radial leg 58 and an axial leg 60, and defines a rabbet 62.

Collectively, the impeller arm 48 and the impeller disk 44 define a generally concave-curved inner flowpath surface 64. The inner flowpath surface 64 extends in a generally longitudinal direction towards the forward end 40 and extends in a generally radial direction near the aft end 42. An annular array of airfoil-shaped impeller blades 66 extend radially outward from the inner flowpath surface 64. The impeller blades 66 are configured in terms of their dimensions, cross-sectional shape, orientation, spacing, and other parameters (in accordance with conventional practice) to provide an incremental velocity increase to the air flowing past them as the impeller 38 rotates. An annular array of splitter blades 68 alternate with the impeller blades 66 around the circumference of the impeller 38. The splitter blades 68 are similar in form to the impeller blades 66 but are shorter in axial length.

An annular shroud assembly 70 surrounds the impeller 38. The shroud assembly 70 defines a generally convex-curved outer flowpath surface 72 that closely surrounds the tips of the impeller and splitter blades 66 and 68. Together the inner and outer flowpath surfaces 64 and 72 define a primary flowpath through the centrifugal portion 26. A forward end of the shroud assembly 70 adjoins the casing 30.

A supporting disk structure is disposed between the axial portion 24 and the centrifugal portion 26. In this particular example, the supporting disk structure is in the form of a vortex spoiler 74. This is an annular structure that is generally T-shaped in half-section, having an annular disk 76, with a hub 78 disposed at its radially inner end and forward and aft arms 80 and 82 at its radially outer end. The radially outer end of the vortex spoiler 74 defines a flowpath surface 84 that is continuous with the inner flowpath surface 64 described above. An array of radially-aligned channels 86 extend through the vortex spoiler 74, communicating with the flowpath surface 84. Their purpose is to extract air flow from the flowpath for use as secondary air within the engine 12 (e.g. for airfoil cooling, sump pressurization, etc.)

Figure 3:
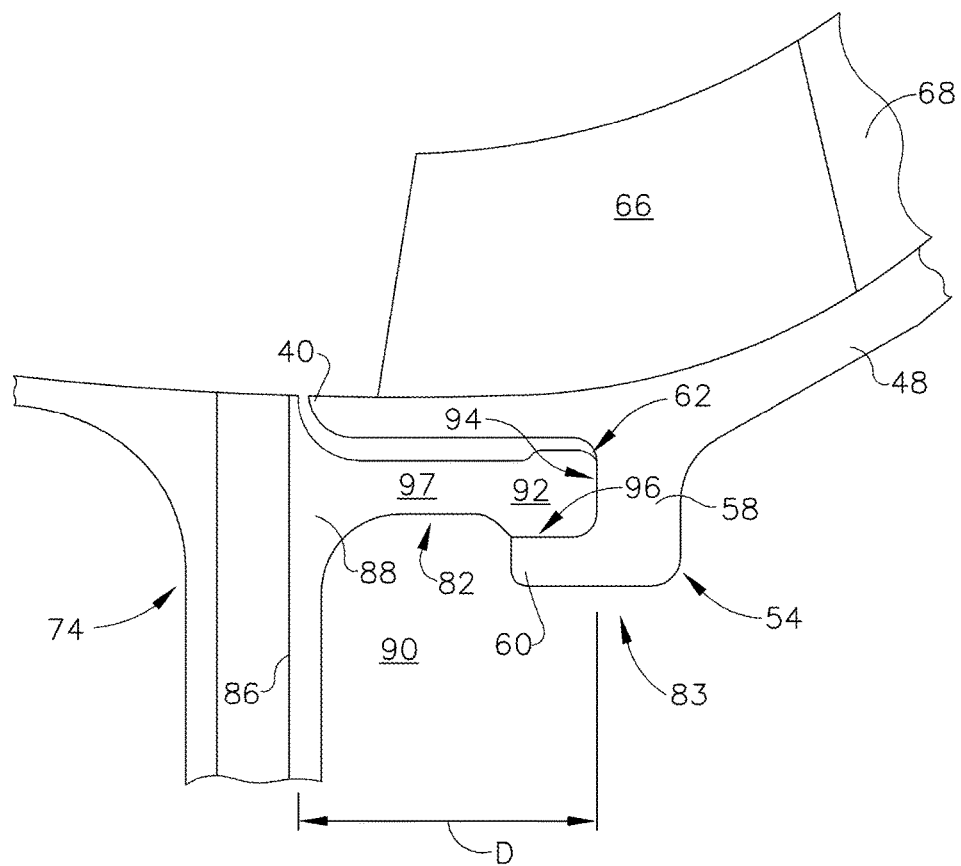
FIG. 3 is an enlarged view of a portion of FIG. 2.

The connection between the vortex spoiler 74 and the impeller arm 48 will be described in more detail with reference to FIG. 3. The aft arm 82 extends axially aft from the disk 76 of the vortex spoiler 74. The aft arm 82 is cantilevered from the disk 76, that is, only its proximal end 88 is attached to the disk 76, and the remainder of the aft arm 82 is unsupported, there being an open gap 90 without support structures between the aft arm 82 and the inner portion of the disk 76. The distal end 92 of the aft arm 82 is received in the rabbet 62, and a portion of the impeller arm 48 overlaps the aft arm 82 in the axial direction. As a result, the effective mechanical connection between the two components is made at a small distance "D" axially aft of the forward end 40 of the impeller 38. This connection is referred to generally as a "rabbet joint" 83 and may be characterized as being "axially offset" from the forward end 40 of the impeller 38.

The distal end 92 of the aft arm 82 includes an aft face 94 and an inner face 96. The joint is sized such that, at static assembly, there is a slight radial interference between the inner face 96 and the axial leg 60 of the hook 54, and the aft face 94 contacts the radial leg 58 of the hook 54. There is a small clearance between a radially outer surface of the aft arm 82 and the impeller arm 48. There is a significant axial compressive load at the interface between the aft face 94 and the hook 54, resulting in large friction loads at the rabbet joint 83, which permit torques transmission between the impeller 38 and the vortex spoiler 74 (and consequently to the axial portion 24).

The shape and dimensions of the aft arm 82 are tailored to produce a stiffness which is neither too large nor too small. In the illustrated example, the aft arm 82 incorporates a neck 97 having reduced radial thickness relative to the remainder of the aft arm 82. This lowers the stiffness of the aft arm 82.

In operation, the impeller 38 rotates at high speed, subjecting the impeller arm 48 to significant hoop stresses. Due to its particular combination of radius and wheel speed, the impeller 38 cannot not self-support its own speed induced-loads. In the absence of suitable support, this would lead to unacceptable stress concentrations in the impeller blades 66. However, the rabbet joint connection engages the vortex spoiler 74 which provides flexible, tailored support or restraint to the impeller arm 48 in the radial direction. A portion of the hoop stress that would otherwise be carried by the impeller arm 48 is therefore transferred to the bore of the vortex spoiler 74.

The rabbet joint connection described herein enables a compressor architecture in which a very high impeller inlet radius allows significant axial length to be removed from the rotor. This results in significant engine-level weight savings. More traditional attachment methods including CURVIC face joints and bolted joints cannot operate at this high a radius and wheel speed with acceptable stress levels.

The foregoing has described a compressor with an impeller arm supported by a rabbet joint to an adjacent disk. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying potential points of novelty, abstract and drawings), or to any novel one, or any novel combination, of the steps of any method or process so disclosed.

What is claimed is:

1. A compressor apparatus comprising:
   a centrifugal impeller mounted for rotation about a centerline axis and carrying a plurality of impeller blades, the impeller having forward and aft ends and including a disk and a cantilevered, annular impeller arm that includes an annular hook with axial and radial legs that collectively define a rabbet; and
   a supporting disk structure disposed axially adjacent to the impeller, the supporting disk structure including a disk with a cantilevered annular aft arm engaging the rabbet of the annular hook to thereby form a rabbet joint;

wherein the aft arm has a radially outer surface and proximal and distal ends, with a neck of reduced radial thickness disposed between the two ends; and wherein there is an interference between the distal end and the annular hook and the neck is positioned such that there is a clearance between the radially outer surface of the aft arm and the impeller arm.

2. The apparatus of claim 1 wherein the rabbet joint is configured to resist radially outward movement of the impeller arm.

3. The apparatus of claim 1 where the rabbet joint is axially offset from the forward end of the impeller.

4. The apparatus of claim 1 wherein an axial compressor is disposed upstream of the supporting disk structure and is mechanically coupled to the supporting disk structure.

5. The apparatus of claim 1 wherein the aft arm is fitted to the rabbet in an interference fit.

6. The apparatus of claim 1 wherein the impeller arm extends axially forward beyond the annular hook.

7. The apparatus of claim 1 wherein the supporting disk structure is an annular vortex spoiler which is generally t-shaped in half-section, having a disk with a hub disposed at its radially inner end, and forward and aft arms disposed at its radially outer end.

8. A compressor apparatus comprising:

a centrifugal impeller mounted for rotation about a centerline axis and carrying a plurality of impeller blades, the impeller having forward and aft ends and including a disk and a cantilevered, annular impeller arm that extends to a forward end and defines a radially inner surface;

an annular hook that extends from the radially inner surface at a position that is axially aft of the forward end of the impeller arm, the hook including a radial leg and an axial leg that together define a rabbet; and a supporting disk structure disposed axially adjacent to the impeller, the supporting disk structure including a disk with a cantilevered annular aft arm engaging the rabbet of the annular hook to thereby form a rabbet joint that is axially offset from the forward end of the impeller;

wherein the aft arm has proximal and distal ends, with a neck of reduced radial thickness disposed between the two ends; and wherein there is an interference between the distal end and the hook and the neck is positioned such that it is spaced away from the inner surface of the annular impeller arm.

* * * * *